US010505328B2

(12) United States Patent
Noguchi

(10) Patent No.: US 10,505,328 B2
(45) Date of Patent: Dec. 10, 2019

(54) SLIDING MEMBER, ROTARY DEVICE, AND METHOD FOR MANUFACTURING SLIDING MEMBER

(71) Applicant: Murata Manufacturing Co., Ltd., Nagaokakyo-shi, Kyoto-fu (JP)

(72) Inventor: Masumi Noguchi, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 263 days.

(21) Appl. No.: 15/364,772

(22) Filed: Nov. 30, 2016

(65) Prior Publication Data

US 2017/0085047 A1    Mar. 23, 2017

Related U.S. Application Data

(63) Continuation of application No. PCT/JP2015/066811, filed on Jun. 11, 2015.

(30) Foreign Application Priority Data

Jun. 20, 2014    (JP) ................. 2014-127298

(51) Int. Cl.
| | | |
|---|---|---|
| H01R 39/40 | (2006.01) | |
| H01R 39/20 | (2006.01) | |
| H01R 43/16 | (2006.01) | |
| H02K 5/14 | (2006.01) | |
| C22C 9/00 | (2006.01) | |
| C22C 9/06 | (2006.01) | |
| H01R 43/12 | (2006.01) | |

(52) U.S. Cl.
CPC ............. *H01R 39/20* (2013.01); *C22C 9/00* (2013.01); *C22C 9/06* (2013.01); *H01R 43/12* (2013.01); *H01R 43/16* (2013.01); *H02K 5/145* (2013.01)

(58) Field of Classification Search
CPC ...... H02K 13/006; H02K 13/04; H01R 39/26; H01R 39/38
USPC ....... 310/230, 231, 232, 233, 234, 235, 237, 310/238, 239, 240, 241, 242, 245, 246
See application file for complete search history.

(56) References Cited

U.S. PATENT DOCUMENTS 4,195,242 A * 3/1980 Mabuchi ................ H01R 39/39
                                                        310/239
4,494,029 A    1/1985 Hoshino et al.
(Continued)

FOREIGN PATENT DOCUMENTS

CN    103153528 A    6/2013
JP    S56-98360 A    8/1981
(Continued)

OTHER PUBLICATIONS

International Search Report issued for PCT/JP2015/066811, dated Aug. 18, 2015.
(Continued)

*Primary Examiner* — Hanh N Nguyen
(74) *Attorney, Agent, or Firm* — Arent Fox LLP

(57) ABSTRACT

A slide-contact portion of a motor has a slide-contact face that contacts a rotating rotor. The slide-contact portion is composed of a material containing an intermetallic compound phase produced by chemical reaction between a first metal which is Sn or an alloy including Sn and a second metal which is a CuNi alloy, a CuMn alloy, an AgPd alloy, a CuAl alloy, or a CuCr alloy.

11 Claims, 17 Drawing Sheets

(56) References Cited

U.S. PATENT DOCUMENTS

| | | | |
|---|---|---|---|
| 5,879,747 A | 3/1999 | Murakami et al. | |
| 6,933,651 B2 | 8/2005 | Someya et al. | |
| 2002/0140313 A1* | 10/2002 | Noya | H01R 39/16 310/233 |
| 2003/0155836 A1* | 8/2003 | Uda | H01R 39/48 310/239 |
| 2005/0006976 A1 | 1/2005 | Someya et al. | |
| 2006/0043819 A1 | 3/2006 | Kobayashi | |
| 2007/0120437 A1* | 5/2007 | Day | H01R 39/08 310/232 |
| 2013/0233618 A1 | 9/2013 | Nakano et al. | |

FOREIGN PATENT DOCUMENTS

| | | |
|---|---|---|
| JP | S60-159140 A | 8/1985 |
| JP | H06-141514 A | 5/1994 |
| JP | H09-140103 A | 5/1997 |
| JP | 2001-37163 A | 2/2001 |
| JP | 2001-119903 A | 4/2001 |
| JP | 2004-124224 A | 4/2004 |
| JP | 2005-51987 A | 2/2005 |
| JP | 2005-229687 A | 8/2005 |
| JP | 2005295699 A | 10/2005 |
| JP | 2006-67702 A | 3/2006 |
| JP | 2006328542 A | 12/2006 |
| JP | 2007-28841 A | 2/2007 |
| JP | 2007-324244 A | 12/2007 |
| JP | 2011193657 A | 9/2011 |
| JP | 5018978 B1 | 9/2012 |

OTHER PUBLICATIONS

Written Opinion of the International Searching Authority issued for PCT/JP2015/066811, dated Aug. 18, 2015.

* cited by examiner

SLIDING MEMBER, ROTARY DEVICE, AND METHOD FOR MANUFACTURING SLIDING MEMBER

CROSS REFERENCE TO RELATED APPLICATIONS

The present application is a continuation of International application No. PCT/JP2015/066811, filed Jun. 11, 2015, which claims priority to Japanese Patent Application No. 2014-127298, filed Jun. 20, 2014, the entire contents of each of which are incorporated herein by reference.

FIELD OF THE INVENTION

The present invention relates to a sliding member having a slide-contact face that contacts a rotating object, a rotary device including the sliding member, and a method for manufacturing the sliding member.

BACKGROUND OF THE INVENTION

Motors (electric motors) and dynamos (generators) have widely been used as rotary devices that convert electric energy into rotational energy or vice versa. The rotary device includes a sliding member having a slide-contact face that contacts a rotating object. The sliding member takes a form of a brush or a commutator.

For example, the motor has a brush that is always in slide contact with a commutator to make a current flow into a coil. Resistance loss and slide contact (friction) between the brush and the commutator raise the temperature of the brush and the commutator. Therefore, the life of the motor largely depends on durability of the brush. Patent Documents 1 to 6 disclose highly durable brushes.

Patent Document 1 discloses a brush formed of a resin-based material including silver powder and carbon powder mixed with a thermosetting resin. Patent Document 2 discloses a brush formed of a resin-based material including carbon powder mixed with a thermoplastic resin. Patent Document 3 discloses a brush formed of a resin-based material including copper powder, carbon powder, and zinc compound mixed with a thermoplastic resin.

Patent Document 4 discloses a non-resin-based brush formed of a sintered compact composed of silicon carbide. Patent Document 5 discloses a non-resin-based brush formed of a sintered compact composed of copper and carbon. Patent Document 6 discloses a non-resin-based brush formed of a sintered compact composed of carbon.

Patent Document 1: Japanese Patent Application Laid-Open No. 2004-124224
Patent Document 2: Japanese Patent Application Laid-Open No. 2005-229687
Patent Document 3: Japanese Patent Application Laid-Open No. 2007-28841
Patent Document 4: Japanese Patent Application Laid-Open No. 2001-37163
Patent Document 5: Japanese Patent Application Laid-Open No. 2001-119903
Patent Document 6: Japanese Patent Application Laid-Open No. 2006-67702

SUMMARY OF THE INVENTION

The resin-based brushes (sliding members) disclosed in Patent Documents 1 to 3 containing carbon powder having improved abrasion resistance have limited durability because the brushes are formed of resin. The resin-based brushes disclosed in Patent Documents 1 to 3 release carbon powder or powder of other metals by abrasion of resin, which may cause a short in a motor circuit.

The non-resin-based brushes (sliding members) disclosed in Patent Documents 4 to 6 are free of abrasion of resin as well as release of carbon powder and metal powder resulting from abrasion of resin. The non-resin-based brushes disclosed in Patent Documents 4 to 6 however require high sintering temperature of 1350° C. or above for silicon carbide, for example, and 700° C. or above for carbon-based material.

That is, the non-resin-based brushes disclosed in Patent Documents 4 to 6 having high durability require very high sintering temperature. Thus, the method for manufacturing the non-resin-based brushes disclosed in Patent Documents 4 to 6 tend to become complicated, which makes it difficult to have high dimensional accuracy. The non-resin-based brushes disclosed in Patent Documents 4 to 6 are therefore high in manufacturing cost.

An object of the present invention is to provide a sliding member that has high durability and can be manufactured easily and with high accuracy, a rotary device, and a method for manufacturing the sliding member.

To solve the aforementioned problem, a sliding member according to the present invention is configured as described below.

The present invention provides a sliding member used in a rotary device that converts electric energy into rotational energy or vice versa, the sliding member including a slide-contact portion having a slide-contact face that contacts a rotating object, and the slide-contact portion contains an intermetallic compound produced by reaction between first metal which is Sn or an alloy including Sn and second metal which is a CuNi alloy, a CuMn alloy, an AgPd alloy, a CuAl alloy, or a CuCr alloy.

For example, the intermetallic compound produced by reaction between the first metal and the second metal contains at least two selected from a group of Sn, Cu, and Ni or at least two selected from a group of Su, Cu and Mn. Specifically, the intermetallic compound is $Cu_6Sn_5$, $Ni_3Sn_4$, $Cu_2NiSn$, for example.

The intermetallic compound is produced under a reaction temperature lower than the sintering temperature of the non-resin-based brush (for example, 700° C. or above) and has a melting point of 300° C. or above. Thus, the slide-contact portion does not require such a high sintering temperature as the non-resin-based brushes and can be formed at a low temperature. That is, the sliding member having such a composition can be manufactured easier and with higher accuracy than the non-resin-based brushes.

The intermetallic compound has a hardness (indentation hardness) of about 300 to 500 mg/μm². Thus, there is a little chance of the metal powder coming out of the slide-contact portion. That is, the sliding member having such a composition has higher durability than the resin-based brushes.

The sliding member having the composition described above has high durability and can be manufactured easily and with high accuracy.

The sliding member takes a form of a commutator or a brush. The slide-contact portion constitutes a portion of the commutator or the brush.

The slide-contact portion preferably includes carbon. With carbon contained therein, the abrasion resistance of the slide-contact portion can further be improved.

The slide-contact portion is preferably composed of a porous material.

The slide-contact portion composed of a porous material has a large specific surface area. This gives a large area that contacts the air stream produced by the rotation of the rotor, which increases heat dissipation of the slide-contact portion.

An arm section composed of third metal is preferably further included. The arm section is preferably bonded to the slide-contact portion with an alloy layer composed of the first metal and the third metal.

The alloy layer firmly bonds together the slide-contact portion and the arm section.

Alternatively, an arm section is bonded to the slide-contact portion with a conductive bonding material interposed therebetween.

The conductive bonding material firmly bonds together the slide-contact portion and the arm section.

A rotary device according to the present invention is configured as will be described below.

The rotary device includes any one of the sliding members described above and a rotor.

A method for manufacturing a sliding member including an arm section and used in a rotary device that converts electric energy into rotational energy or vice versa includes a step of preparing a mixture including first metal which is Sn or an alloy including Sn and second metal which is a CuNi alloy, a CuMn alloy, an AgPd alloy, a CuAl alloy, or a CuCr alloy, and a step of heat treating the mixture to cause reaction between the first metal and the second metal to produce an intermetallic compound that constitutes a slide-contact portion formed on a portion of the arm section.

By this manufacturing method, a sliding member having high durability can be manufactured easily and with high accuracy.

Heat treating can be performed at a low heating temperature by treating under a predetermined high pressure.

In the forming step, the mixture is preferably heat treated with a portion of the arm section inserted in the mixture.

In this manufacturing method, the slide-contact portion is formed on a portion of the arm section by heat treatment.

According to the present invention, a sliding member having high durability can be manufactured easily and with high accuracy.

DETAILED DESCRIPTION OF PREFERRED EMBODIMENTS OF THE INVENTION

A brush according to a first embodiment of the present invention will now be described.

Figure 1:
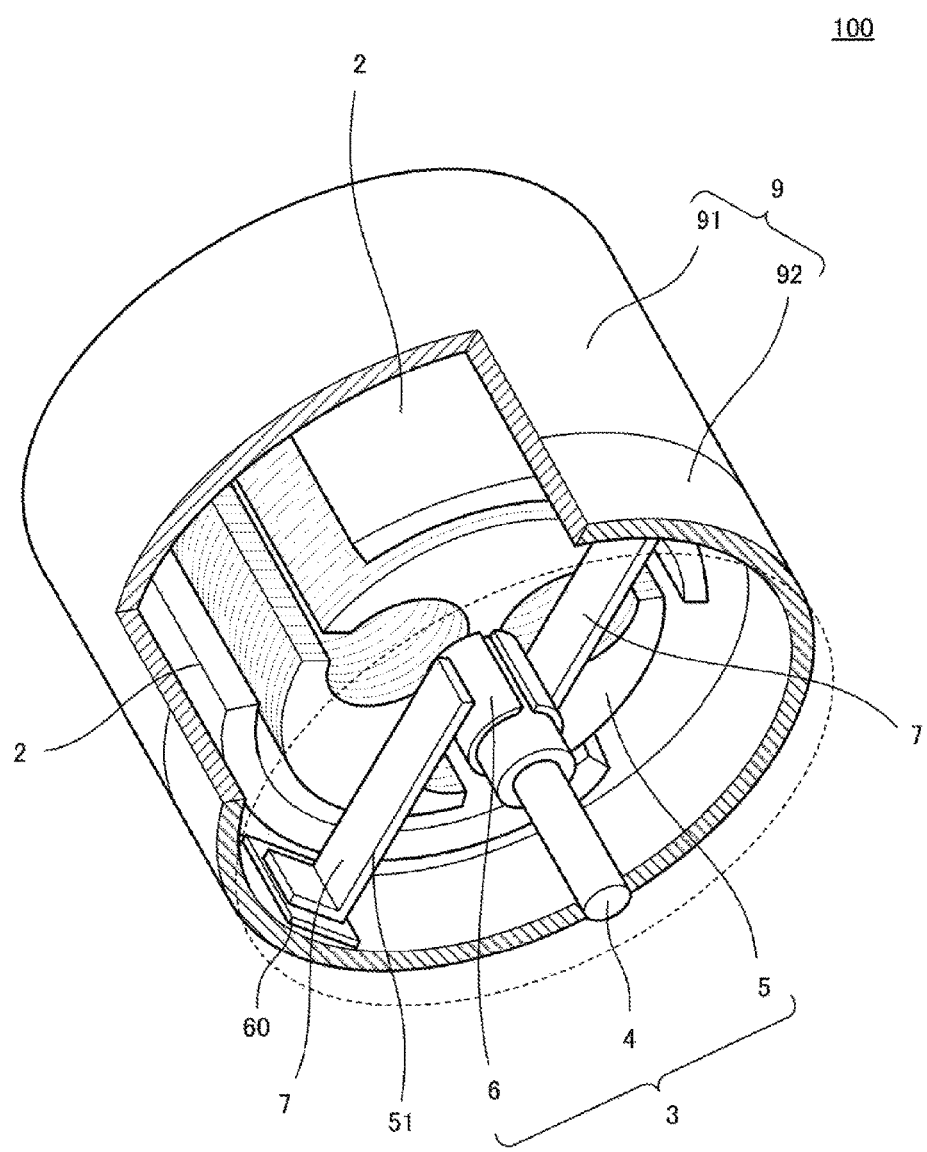
FIG. 1 is an external perspective view of a motor 100 including a brush 7 according to a first embodiment of the present invention.
Figure 2:
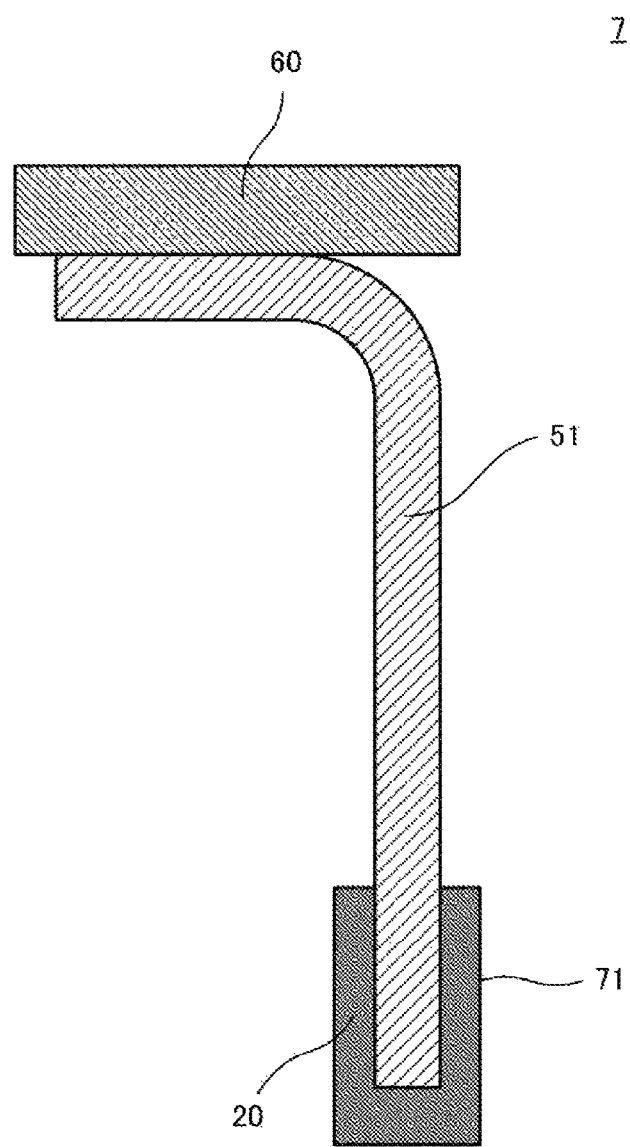
FIG. 2 is a sectional view of the brush 7 illustrated in FIG. 1.
Figure 3:
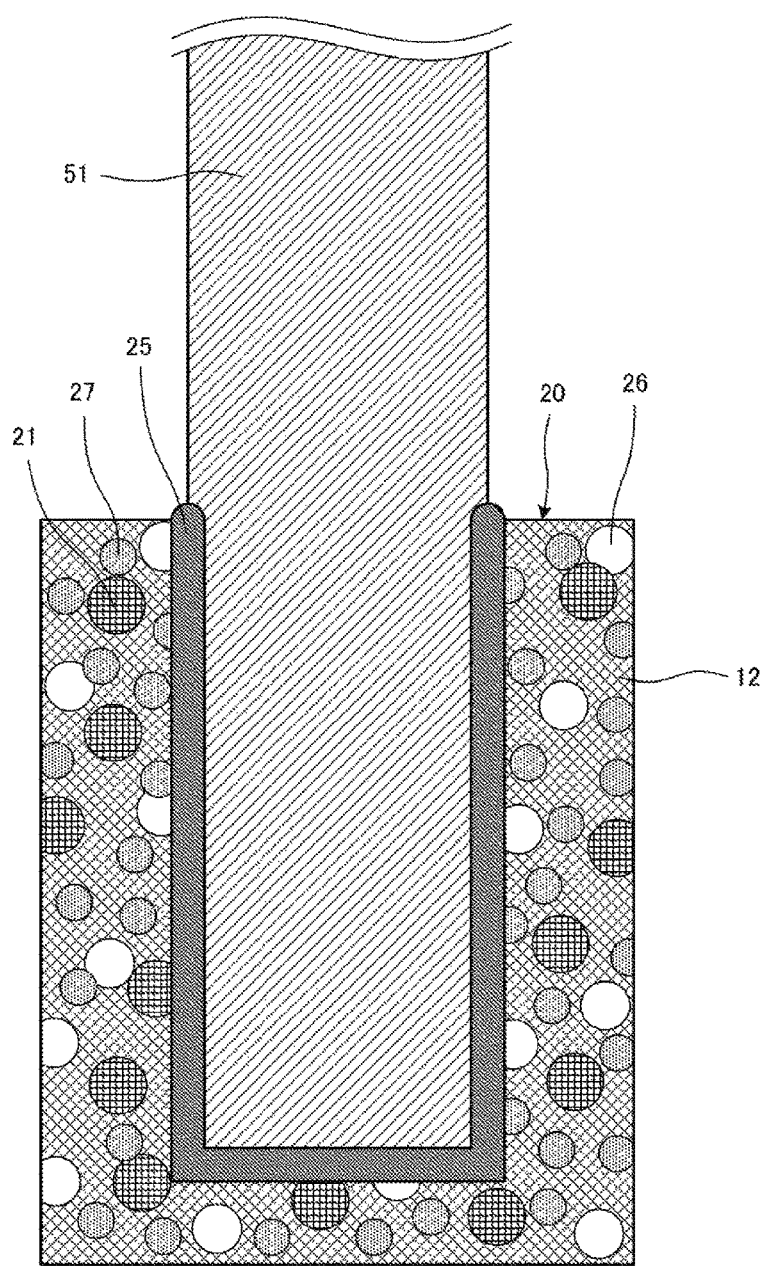
FIG. 3 is an enlarged sectional view of a distal portion of the brush 7 illustrated in FIG. 1.

FIG. 1 is an external perspective view of a motor 100 including a brush 7 according to the first embodiment of the present invention. FIG. 2 is a sectional view of the brush 7 illustrated in FIG. 1. FIG. 3 is an enlarged sectional view of a distal portion of the brush 7 illustrated in FIG. 1.

The motor 100 includes a casing 9, a permanent magnet 2, a rotor 3, and a brush 7. The motor 100 converts electric energy into rotational energy (torque) by rotation of the rotor 3.

The casing 9 houses the permanent magnet 2, the rotor 3, and the brush 7. The casing 9 is composed of a case body 91 and a cap 92. The cap 92 is detachably attached to the case body 91. The permanent magnet 2 is fixed to the inner circumference of the case body 91. A fixing section 60 of the brush 7, which will be described later, is fixed to the inner circumference of the cap 92.

The rotor 3 includes a rotor shaft 4 rotatably supported inside the casing 9, and an armature 5 and commutators 6 electrically connected to a coil (not shown) of the armature 5 are provided on the rotor shaft 4. The armature 5 is composed of an iron core and a coil (illustration is omitted). Three commutators 6 are each a curved sheet of metal taking a form of a segment of a cylinder and are provided on a cylindrical insulating body by integral molding or by bonding with adhesive.

As illustrated in FIGS. 2 and 3, the brush 7 includes the fixing section 60, an arm section 51, and a slide-contact portion 20. The end of the arm section 51 opposite the slide-contact portion 20 is bonded to the fixing section 60 with a conductive bonding material such as solder interposed therebetween. The fixing section 60 is fixed to the inner face of the casing 9. The arm section 51 is composed of third metal.

A flexible conductive metal such as phosphor bronze or nickel silver that can be formed into a spring may be used as the material of the arm section 51. Regarding conductivity, the material of the arm section 51 is preferably composed of a metal containing copper. A relatively hard material such as stainless steel may be used as the material of the fixing section 60.

The slide-contact portion 20 has a slide-contact face 71 that contacts the rotating rotor 3. The commutator 6 also has a slide-contact face that contacts the rotating rotor 3. The slide-contact portion 20 of the brush 7 is always in slide contact with the commutators 6 to make a current flow into the coil of the armature 5. The brush 7 and the commutators 6 reach high temperature by resistance loss and slide contact (friction). Thus, the temperature in the internal space of the casing 9 also becomes high.

As illustrated in FIG. 3, the slide-contact portion 20 is composed of an intermetallic compound phase 12 produced by chemical reaction between first metal 11 (see FIG. 5) and second metal 21, which will be described later. The slide-contact portion 20 contains carbon 27, pores 26, and the second metal 21 in the intermetallic compound phase 12. The first metal 11, the second metal 21, and the carbon 27 take a form of powder particles.

The first metal 11 is a pure metal of Sn. The second metal 21 is an alloy of CuNi. The intermetallic compound phase 12 is composed of a CuNiSn alloy. The alloy layer 25 will be described later.

The slide-contact portion 20 has as a main phase the intermetallic compound phase 12 produced by reaction between Sn and a CuNi alloy. The CuNiSn alloy composing the intermetallic compound phase 12 has a reaction temperature of about 200° C. and a melting point of 300° C. or above.

Thus, the slide-contact portion 20 does not require such a high sintering temperature as the non-resin-based brushes and can be formed at a low temperature. That is, the brush 7 can be manufactured easier and with higher accuracy than the non-resin-based brushes.

The intermetallic compound phase 12 has a hardness (indentation hardness) of about 300 to 500 mg/μm$^2$. Thus, there is a little chance of the metal powder coming out of the intermetallic compound phase 12. That is, the brush 7 has higher durability than the resin-based brushes.

Therefore, the brush 7 according to the embodiment has high durability and can be manufactured easily and with high accuracy.

The CuNiSn alloy has approximately the same conductivity as a carbon containing copper powder that is used for a slide-contact portion of a conventional brush. The brush 7 according to the embodiment has high conductivity.

The slide-contact portion 20 preferably contains the carbon 27 in the intermetallic compound phase 12. With the carbon 27 contained, the abrasion resistance of the slide-contact portion 20 can further be improved.

As illustrated in FIG. 3, the slide-contact portion 20 is preferably composed of a porous material including pores 26.

The brush 7 and the commutator 6 are heated by resistance loss, and frictional heat caused by slide contact is generated at the slide-contact faces of the brush 7 and the commutator 6. Here, the slide-contact portion 20 composed of a porous material offers a large specific surface area. A large area contacting the air stream produced by the rotation of the rotor 3 increases heat dissipation of the slide-contact portion 20.

A porosity of the slide-contact portion 20 below 0.1% can hardly provide an air cooling effect, whereas a porosity of the slide-contact portion 20 above 60% cannot provide sufficient strength. Thus, the porosity of the slide-contact portion 20 is preferably within a range from 0.1 to 60%.

The motor 100 including the brush 7 according to the embodiment also provides a similar effect as the brush 7.

A method for manufacturing the brush 7 will now be described below.

Figure 4:
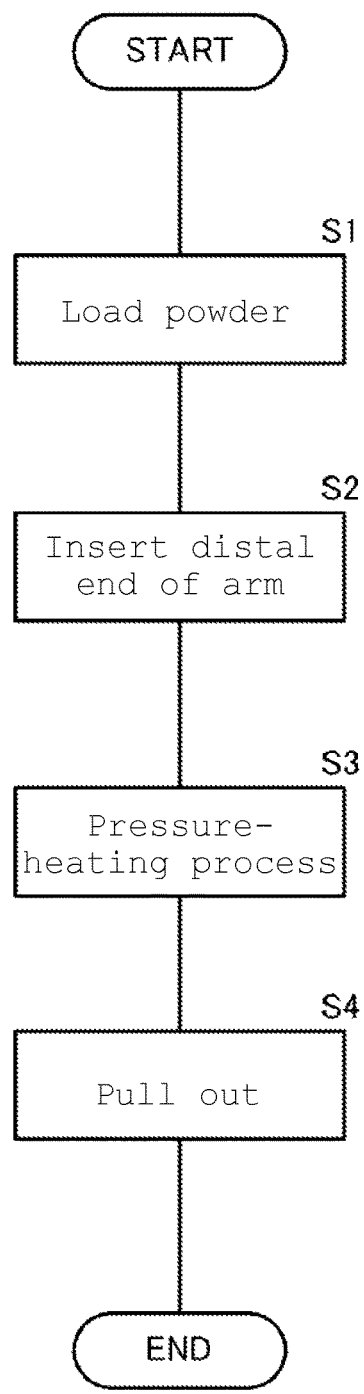
FIG. 4 is a flow chart illustrating a method for manufacturing the brush 7 illustrated in FIG. 1.
Figure 5:
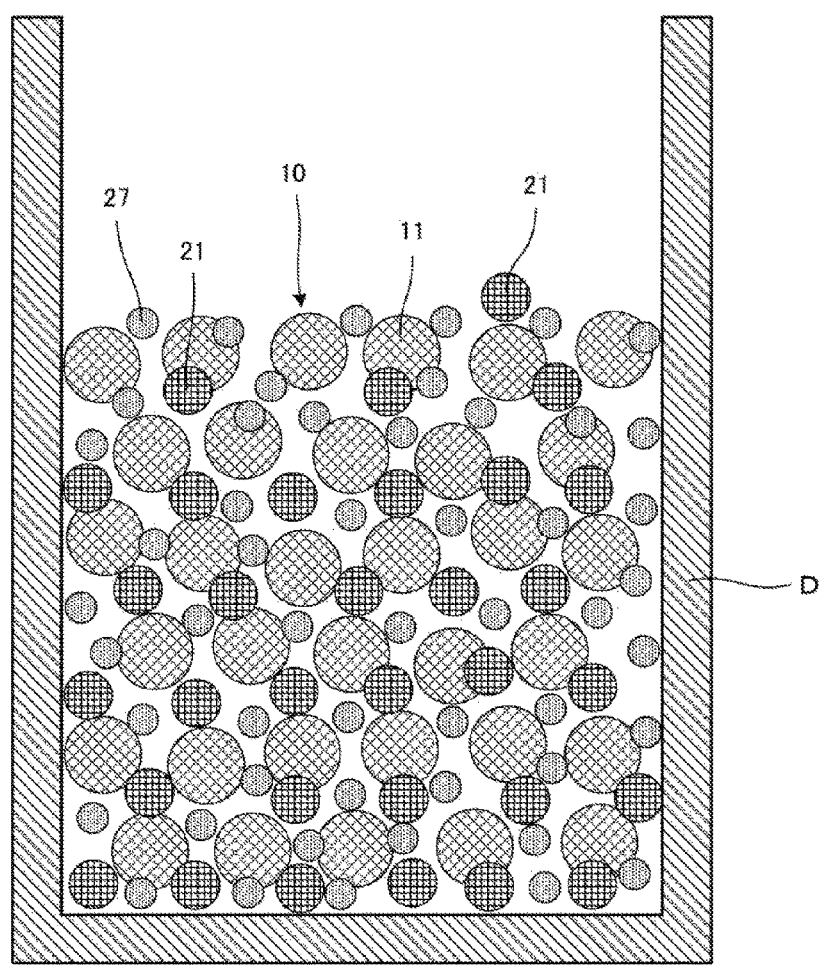
FIG. 5 is a sectional view illustrating a loading step in FIG. 4.
Figure 6:
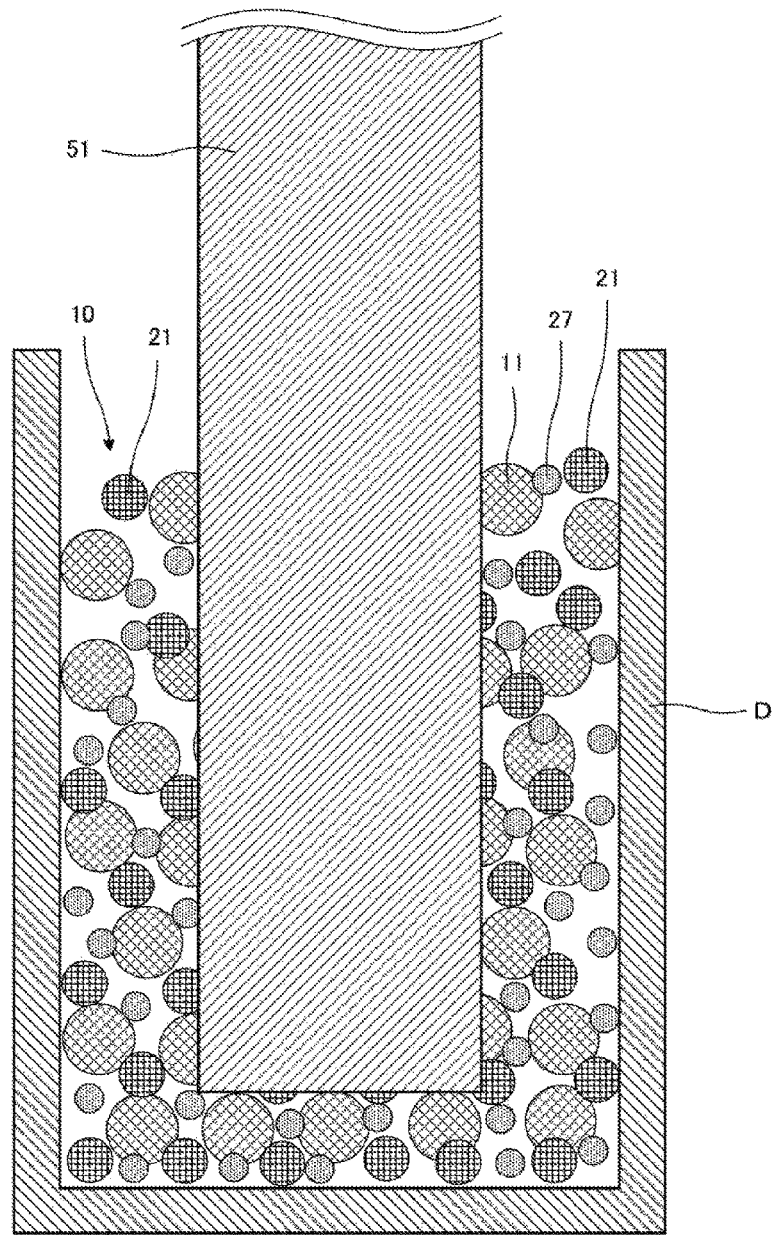
FIG. 6 is a sectional view illustrating an inserting step in FIG. 4.
Figure 7:
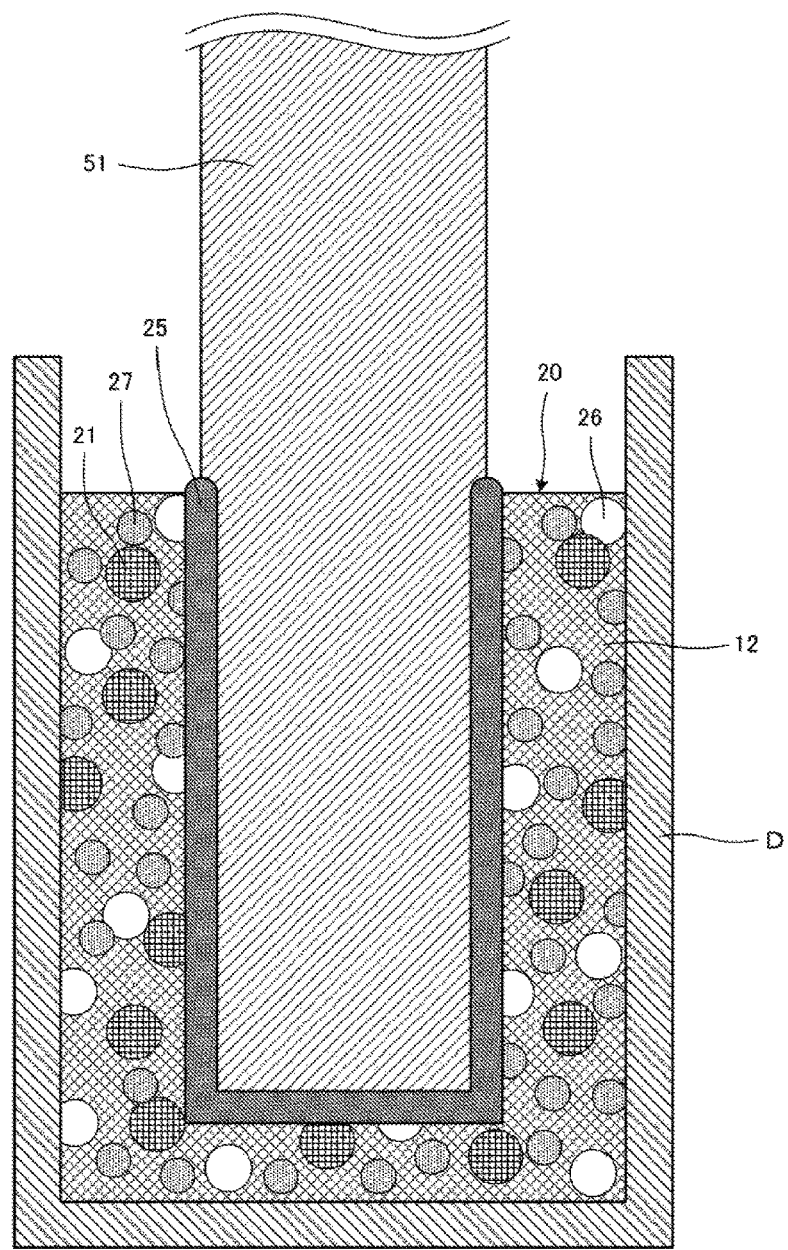
FIG. 7 is a sectional view illustrating a pressure-heating step in FIG. 4.

FIG. 4 is a flow chart illustrating a method for manufacturing the brush 7 illustrated in FIG. 1. FIG. 5 is a sectional view illustrating a loading step in FIG. 4. FIG. 6 is a sectional view illustrating an inserting step in FIG. 4. FIG. 7 is a sectional view illustrating a pressure-heating step in FIG. 4.

The pressure-heating step in FIG. 4 corresponds to a forming step of the present invention.

First, an arm section 51 and a fixing section 60 bonded together with a bonding material and a die-cast container D are prepared.

As illustrated in FIG. 5, the first metal 11, the second metal 21, and the carbon 27 are loaded in the container D (S1 in FIG. 4). In the embodiment, Sn powder of an average particle size of 20 μm, CuNi alloy powder of an average particle size of 5 μm, and carbon powder of an average particle size of 1 μm are loaded in the container D. The compounding ratio of Sn powder, CuNi alloy powder, and carbon powder is 10:10:1 by weight.

After loading the powder, the first metal 11, the second metal 21, and the carbon 27 are mixed using a pestle or the like to prepare a uniformly mixed powder mixture 10. The powder mixture 10 corresponds to the mixture of the present invention.

The compounding ratio of Sn powder and CuNi alloy powder is preferably within a range from 5:95 to 50:50 by weight. Excessive Sn powder results in remaining Sn component which may melt at high temperature or adhere by sliding. When CuNi alloy powder is excessively mixed, the excessive CuNi alloy component may adhere by sliding.

The Sn powder preferably has an average particle size (D50) within a range from 5 to 50 μm. The CuNi alloy powder preferably has an average particle size (D50) within a range from 0.1 to 80 μm.

The Sn powder having an average particle size below 5 μm may not melt. The Sn powder having an average particle size above 50 μm may cause variation in composition of the material resulting from the reaction.

The CuNi alloy powder having an average particle size below 0.1 μm may result in poor wettability which may cause the CuNi alloy powder and the Sn powder to separate from each other. The CuNi alloy powder having an average particle size above 80 μm results in remaining CuNi alloy powder which may adhere by sliding.

The contained amount of the carbon powder is preferably within a range from 0.1 to 20% by weight of the total amount of the Sn powder and the CuNi alloy powder. The carbon powder preferably has an average particle size (D50) within a range from 0.01 to 50 μm.

The compounding amount of carbon powder below 0.1% by weight may cause adhesion of metal composition by sliding. The compounding amount of the carbon powder above 20% by weight may increase contact resistance.

The carbon powder having an average particle size below 0.01 μm may come out of the resulting material, which causes a loss in a lubricating effect. The average particle size above 50 μm may increase contact resistance.

As illustrated in FIG. 6, the distal end of the arm section 51 is inserted in the powder mixture 10 (S2 in FIG. 4).

With the distal end of the arm section 51 inserted in the powder mixture 10, as illustrated in FIG. 7, the powder mixture 10 is heated at a predetermined temperature (200° C. in the embodiment) under a predetermined pressure (20 MPa in the embodiment) (S3 in FIG. 4).

By heating the powder mixture 10 illustrated in FIG. 6, the slide-contact portion 20 illustrated in FIG. 7 is formed. The slide-contact portion 20 is composed of the intermetallic compound phase 12, the second metal 21 contained in the intermetallic compound phase 12, the carbon 27, the pores 26, and the CuSn alloy layer 25.

In detail, heating of the powder mixture 10 causes chemical reaction between the first metal and the second metal to produce the intermetallic compound (for example, $Cu_6Sn_5$, $Ni_3Sn_4$, $Cu_2NiSn$). The reaction is generated by, for example, transient liquid phase diffusion bonding (TLP bonding). The produced intermetallic compound is an alloy containing at least two selected from a group of Cu, Ni, and Sn. The melting point of the intermetallic compound is 300° C. or above, or in some cases, 400° C. or above.

The intermetallic compound phase 12 is composed of the intermetallic compound. That is, the slide-contact portion 20 has a CuNiSn alloy phase as a main phase in which the second metal particles, the carbon particles, and the pores are dispersed.

Heating of the powder mixture 10 also causes chemical reaction between the first metal 11 and the third metal composing the arm section 51 to form the CuSn alloy layer 25. The intermetallic compound phase 12 and the arm section 51 are thereby firmly bonded together.

CuNi alloy powder may remain in the intermetallic compound phase 12. Preferably, no remaining Sn particle substantially exists. Cu-10Ni alloy powder, for example, may be used as CuNi alloy powder.

Preferably, the heating temperature in S3 is about 50 to 300° C. and the pressure is about 0.1 to 50 MPa. A heating step in S3 can be performed at a low heating temperature by treating under a high pressure. The heating time in S3 is preferably about 1 to 10 minutes.

Treating below a heating-pressurizing condition of 50° C. and 0.1 Pa results in a remaining metal component that may adhere by sliding. Treating above a heating-pressurizing condition of 300° C. and 50 Pa excessively promotes the reaction, causing the resulting material to be fragile.

With a heating time shorter than one minute, a metal component may remain and adhere by sliding. With a heating time longer than ten minutes, the resulting material becomes fragile and may crack or chip.

After naturally cooled, the distal end of the arm section 51 is pulled out from the container D (S4 in FIG. 4). With this step, manufacturing of the brush 7 (see FIGS. 2 and 3) having the slide-contact portion 20 on the distal end of the arm section 51 is completed.

As described above, the brush 7 having high durability can be manufactured under a low temperature by the manufacturing method according to the embodiment. The brush 7 can be manufactured easily and thus keeps a high dimensional accuracy.

A brush according to a second embodiment of the present invention will now be described.

Figure 8:
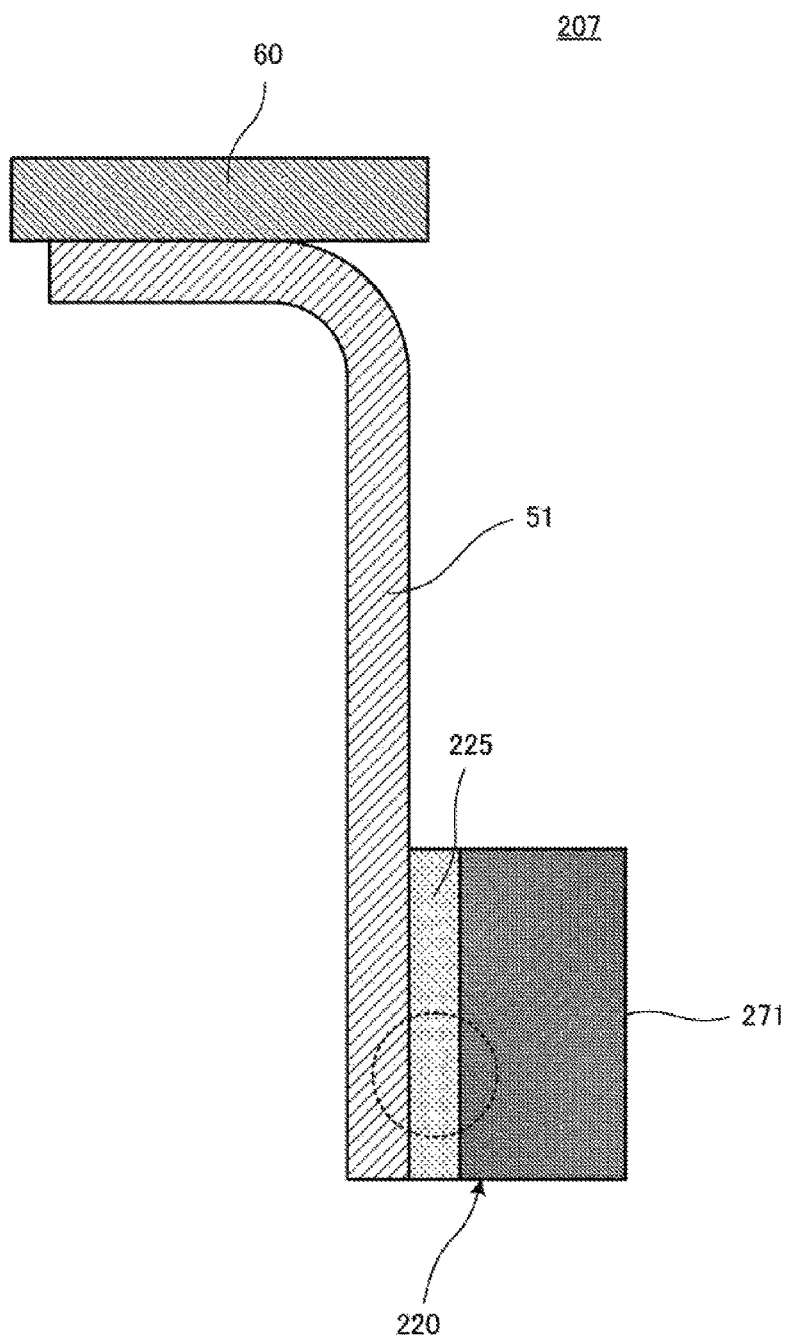
FIG. 8 is a sectional view of a brush 207 according to a second embodiment of the present invention.
Figure 9:
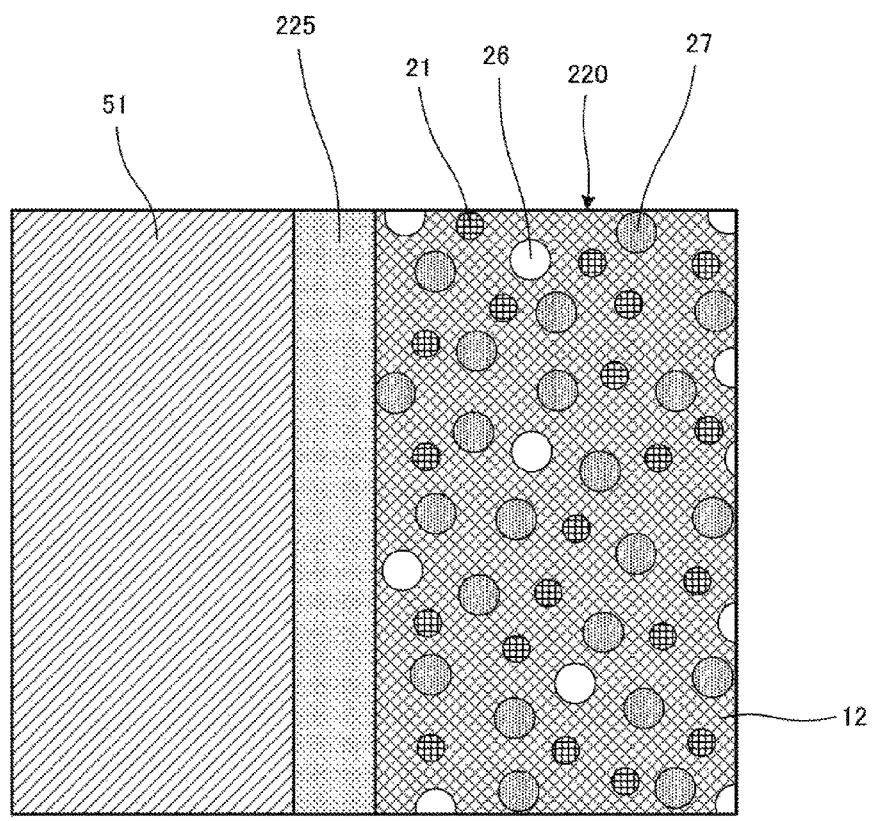
FIG. 9 is an enlarged sectional view of a distal portion of the brush 207 illustrated in FIG. 8.

FIG. 8 is a sectional view of a brush 207 according to the second embodiment of the present invention. FIG. 9 is an enlarged sectional view of a distal portion of the brush 207 illustrated in FIG. 8. FIG. 9 is an enlarged view of the section encircled by a dashed line in FIG. 8.

The brush 207 according to the second embodiment is different from the brush 7 according to the first embodiment in that a slide-contact portion 220 is bonded to an arm section 51 with a conductive bonding material 225 interposed therebetween. The conductive bonding material 225 is, for example, a Sn-based solder (SnAgCu solder in the embodiment). The slide-contact portion 220 has a slide-contact face 271 as well. Other part of the structure is the same as the brush 7.

The slide-contact portion 220 uses the same material as the slide-contact portion 20. As illustrated in FIG. 9, the slide-contact portion 220 is composed of an intermetallic compound phase 12 produced by chemical reaction between the first metal 11 (see FIG. 11) and the second metal 21, which will be described later. The slide-contact portion 220 contains the carbon 27, the pores 26, and the second metal 21 in the intermetallic compound phase 12.

The first metal 11 is a pure metal of Sn. The second metal 21 is an alloy of CuNi. The intermetallic compound phase 12 is composed of a CuNiSn alloy.

The slide-contact portion 220 has as a main phase the intermetallic compound phase 12 produced by reaction between Sn and a CuNi alloy. The CuNiSn alloy composing the intermetallic compound phase 12 has a reaction temperature of about 200° C. and a melting point within a range from 300° C. to 600° C.

Thus, the slide-contact portion 220 does not require such a high sintering temperature as the non-resin-based brushes and can be formed at a low temperature. That is, the brush 207 can be manufactured easier and with higher accuracy than the non-resin-based brushes.

The intermetallic compound phase 12 has a hardness (indentation hardness) of about 300 to 500 mg/$\mu$m$^2$. Thus, there is a little chance of the metal powder coming out of the intermetallic compound phase 12. That is, the brush 207 has higher durability than the resin-based brushes.

Therefore, the brush 207 according to the embodiment has high durability and can be manufactured easily and with high accuracy like the brush 7 according to the first embodiment.

The slide-contact portion 220 preferably contains the carbon 27 in the intermetallic compound phase 12. With the carbon 27 contained, the abrasion resistance of the slide-contact portion 220 can further be improved.

As illustrated in FIG. 9, the slide-contact portion 220 is preferably composed of a porous material including pores 26. This gives a large area that contacts the air stream produced by the rotation of the rotor 3, which increases heat dissipation of the slide-contact portion 220.

The motor 100 can include the brush 207 in place of the brush 7. In such a configuration, the brush 207 is fixed to the casing 9 in place of the brush 7.

A method for manufacturing the brush 207 will now be described below.

Figure 10:
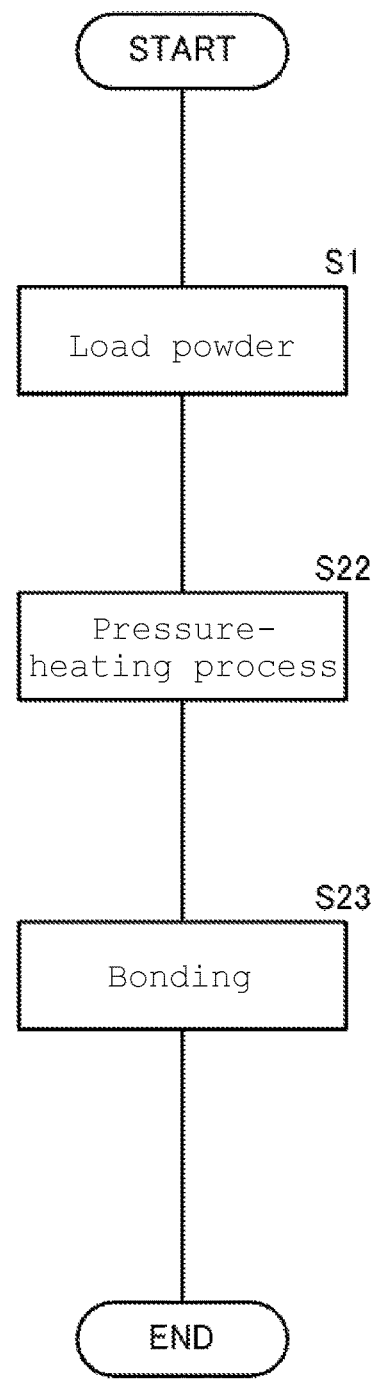
FIG. 10 is a flow chart illustrating a method for manufacturing the brush 207 illustrated in FIG. 8.
Figure 11:
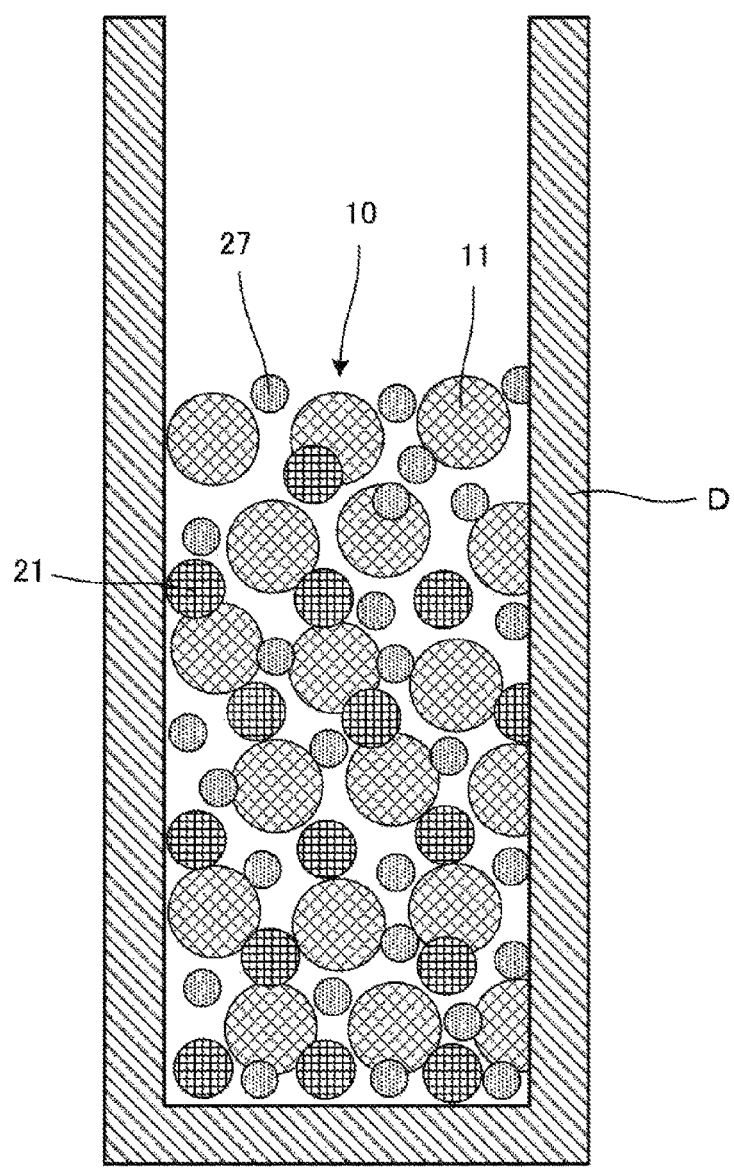
FIG. 11 is a sectional view illustrating a loading step in FIG. 10.
Figure 12:
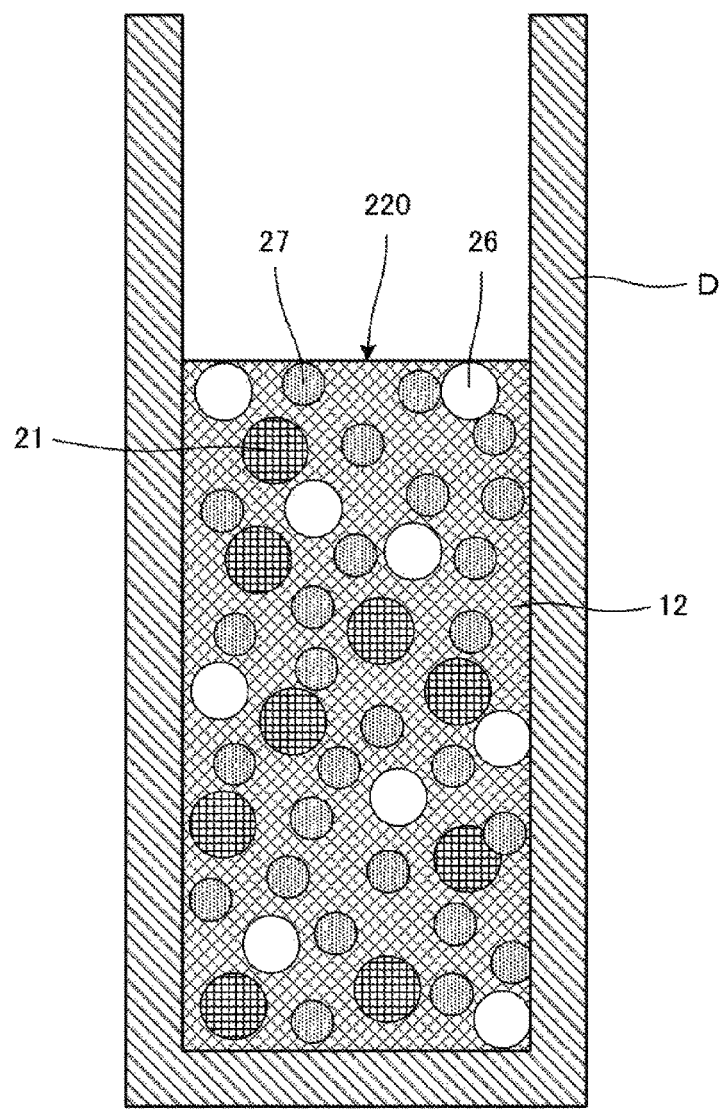
FIG. 12 is a sectional view illustrating a pressure-heating step in FIG. 10.
Figure 13:
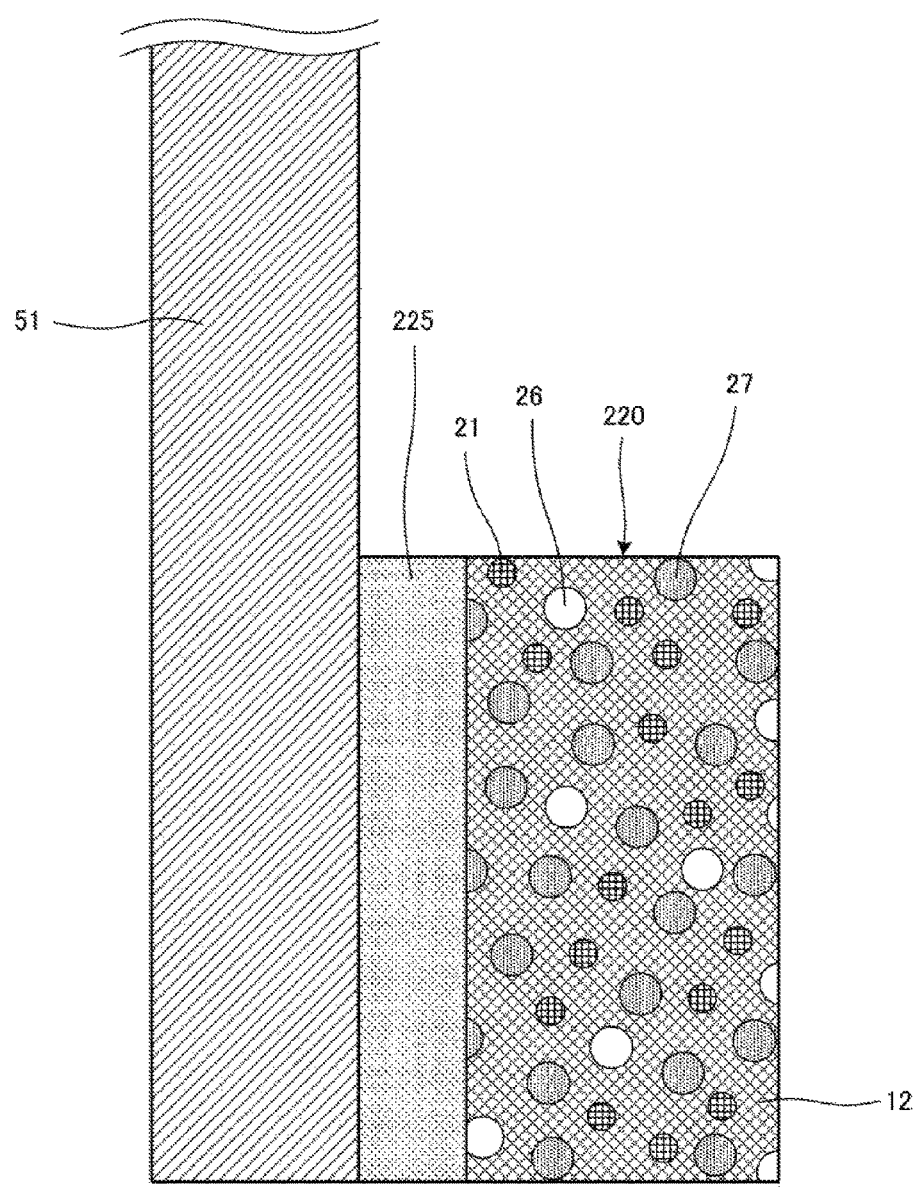
FIG. 13 is a sectional view illustrating a bonding step in FIG. 10.

FIG. 10 is a flow chart illustrating a method for manufacturing the brush 207 illustrated in FIG. 8. FIG. 11 is a sectional view illustrating a loading step in FIG. 10. FIG. 12 is a sectional view illustrating a pressure-heating step in FIG. 10. FIG. 13 is a sectional view illustrating a loading step in FIG. 10.

The method for manufacturing the brush 207 illustrated in FIG. 10 is different from the method for manufacturing the brush 7 illustrated in FIG. 4 in a pressure-heating step S22 and a bonding step in S23. A loading step S1 in FIG. 10 is the same as the loading step S1 in FIG. 4, and thus a detailed description thereof is omitted.

The pressure-heating step S22 and the bonding step S23 correspond to the forming step of the present invention.

First, an arm section 51 and a fixing section 60 bonded together with a bonding material and a die-cast container D are prepared.

As illustrated in FIG. 11, first metal 11, second metal 21, and carbon 27 are loaded in the container D (S1 in FIG. 10). After loading the powder, the first metal 11, the second metal 21, and the carbon 27 are mixed using a pestle or the like to prepare a uniformly mixed powder mixture 10.

Then as illustrated in FIG. 12, the powder mixture 10 is heated at a predetermined temperature (200° C. in the embodiment) under a predetermined pressure (20 MPa in the embodiment) (S22 in FIG. 10).

By heating the powder mixture 10 illustrated in FIG. 11, a slide-contact portion 220 illustrated in FIG. 12 is formed. The slide-contact portion 220 is composed of an intermetallic compound phase 12, the second metal 21 contained in the intermetallic compound phase 12, the carbon 27, and pores 26.

In detail, heating of the powder mixture 10 causes chemical reaction between the first metal and the second metal to produce the intermetallic compound (for example, $Cu_6Sn_5$, $Ni_3Sn_4$, $Cu_2NiSn$). The intermetallic compound phase 12 is composed of the intermetallic compound. That is, the slide-contact portion 220 has a CuNiSn alloy phase as the main phase in which the second metal particles, carbon particles, and the pores are dispersed.

CuNi alloy powder may remain in the intermetallic compound phase 12. Preferably, no remaining Sn particle substantially exists. Cu-10Ni alloy powder, for example, may be used as CuNi alloy powder.

Preferably, the heating temperature in S22 is about 50 to 300° C. and the pressure is about 0.1 to 50 MPa. The heating time in S22 is preferably about 1 to 10 minutes.

Treating below a heating-pressurizing condition of 50° C. and 0.1 Pa results in a remaining metal component that may adhere by sliding. Treating above a heating-pressurizing condition of 300° C. and 50 Pa excessively promotes the reaction, causing the resulting material to be fragile.

With a heating time shorter than one minute, a metal component may remain and adhere by sliding. With a heating time longer than ten minutes, the resulting material becomes fragile and may crack or chip.

After naturally cooled, the slide-contact portion 220 is bonded to the arm section 51 with a conductive bonding material 225 interposed therebetween (S23 in FIG. 10). With this step, manufacturing of the brush 207 (see FIGS. 8 and 9) having the slide-contact portion 220 on the distal end of the arm section 51 is completed.

As described above, the brush 207 having high durability can be manufactured under a low temperature by the manufacturing method according to the embodiment. The brush 207 can be manufactured easily and thus keeps a high dimensional accuracy.

Other Embodiments

In the embodiments described above, the invention is applied to a motor that converts electric energy into rotational energy (torque). The invention is applicable not only to a motor. For example, the invention may be applied to a dynamo that converts rotational energy (torque) into electric energy.

The first metal is pure Sn metal in the embodiment but not limited to such metal. The first metal of the embodiment may be an alloy containing Sn.

The second metal is a CuNi alloy in the embodiment but not limited to such alloy. The second metal of the embodiment may be a CuMn alloy, an AgPd alloy, a CuAl alloy, or a CuCr alloy. For example, in a case where the second metal is a CuMn alloy, melted Sn (first metal) and the CuMn alloy (second metal) react with each other to produce an intermetallic compound containing at least two selected from a group of Cu, Mn, and Sn.

In the embodiment, the first metal 11, the second metal 21, and the carbon 27 are loaded in the container D in the loading step in S1 in FIGS. 4 and 10. The material loaded in S1 is not limited to such materials. For example, powder of a thermoplastic resin may be loaded. In this case, the melted thermoplastic resin intrudes into the pores 26 during the pressure-heating step. On completion of this step, the thermoplastic resin serves as a lubricant.

Figure 14:
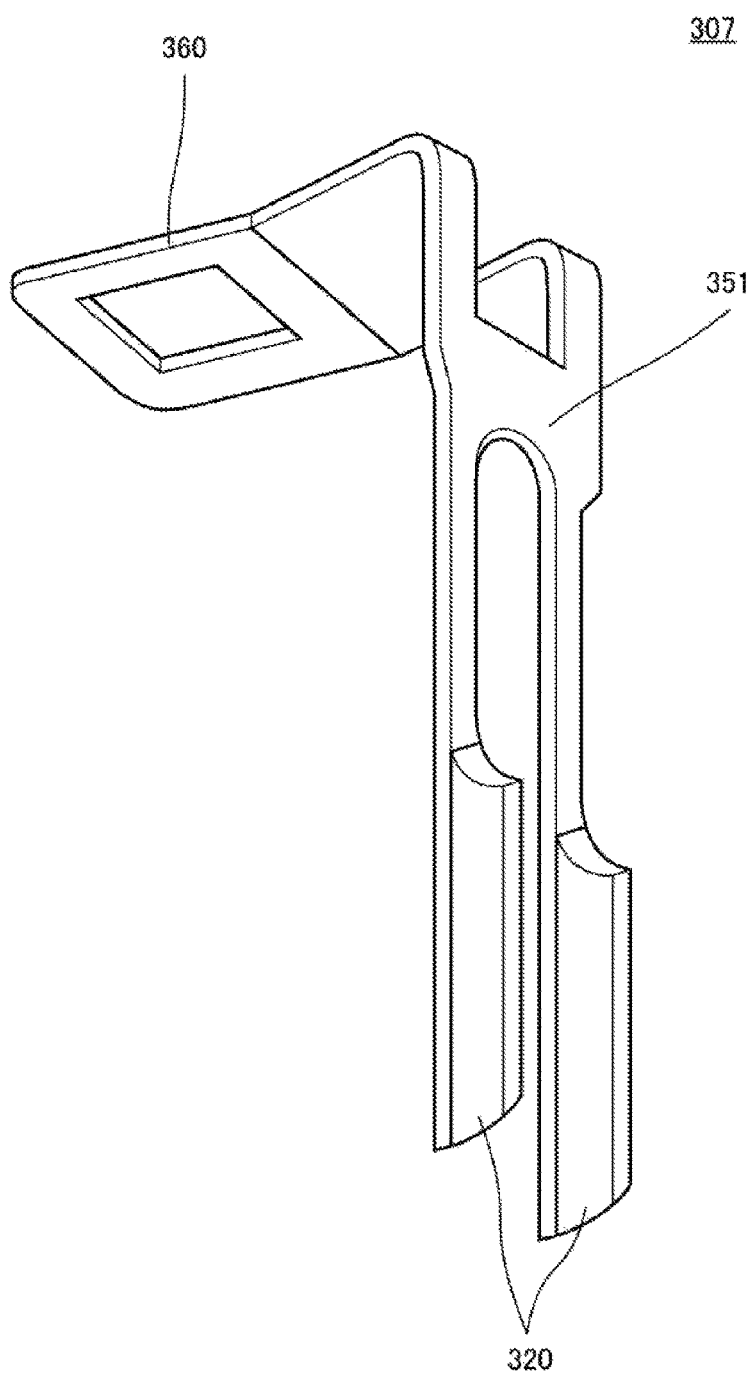
FIG. 14 is a sectional view of a brush 307 according to a third embodiment of the present invention.
Figure 15:
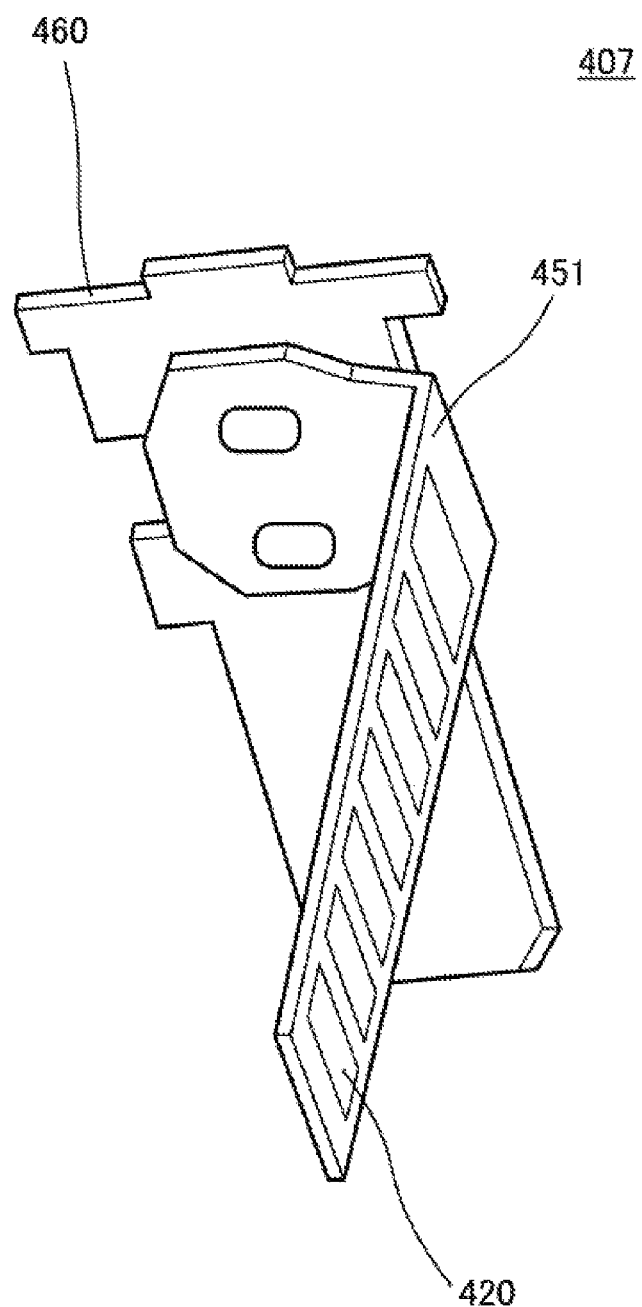
FIG. 15 is a sectional view of a brush 407 according to a fourth embodiment of the present invention.
Figure 16:
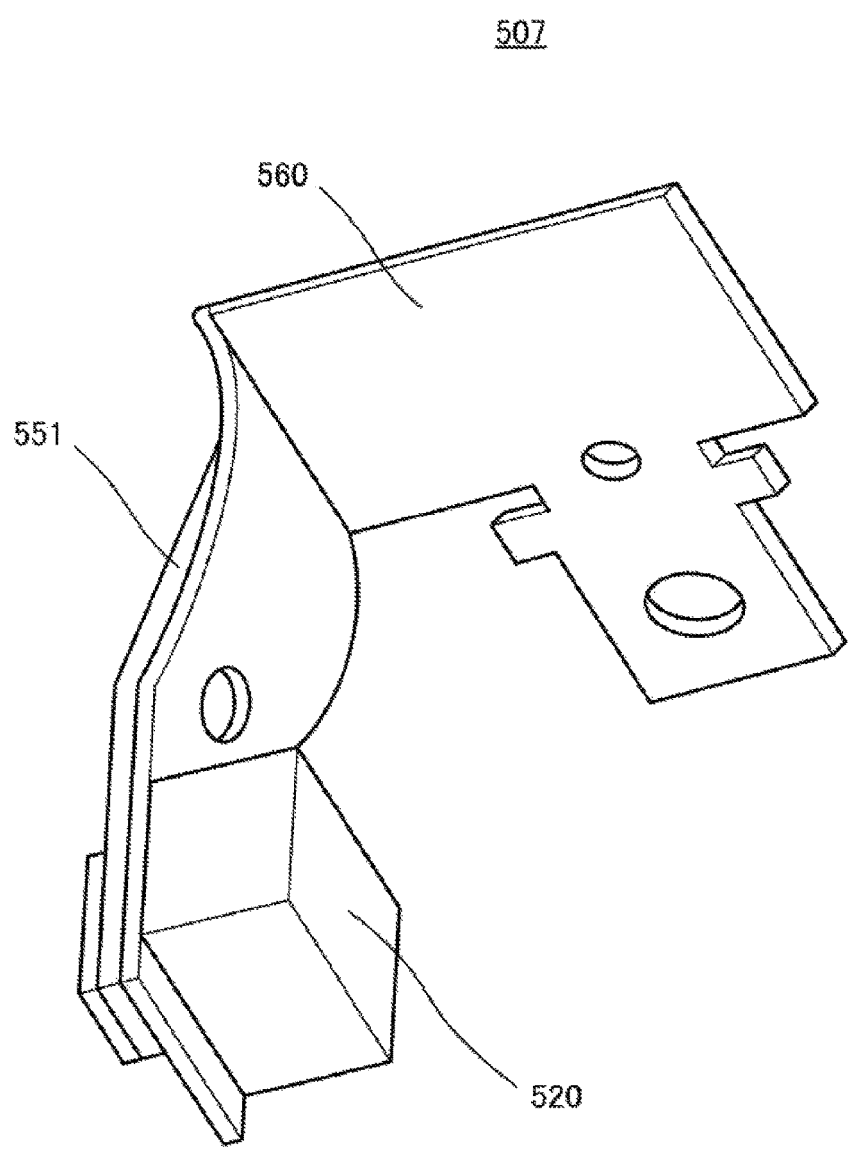
FIG. 16 is a sectional view of a brush 507 according to a fifth embodiment of the present invention.
Figure 17:
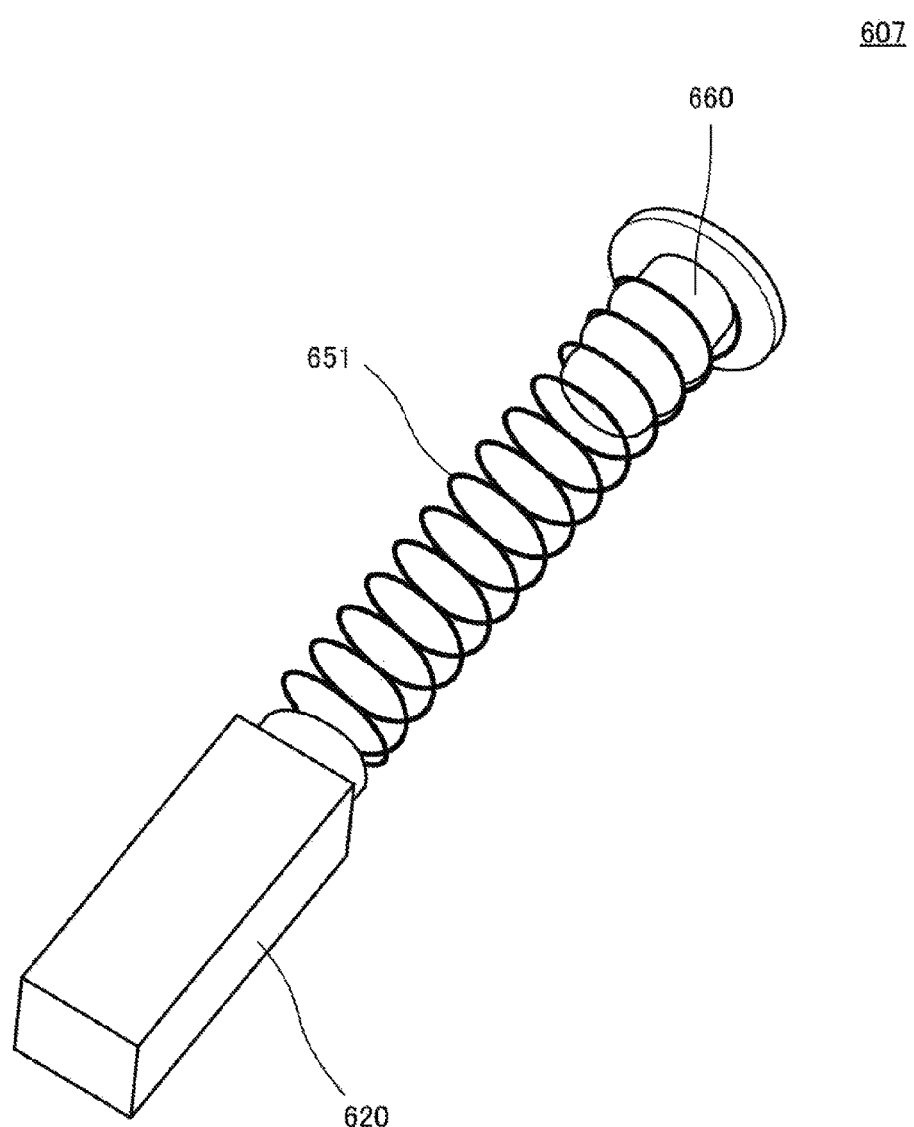
FIG. 17 is a sectional view of a brush 607 according to a sixth embodiment of the present invention.

In the embodiment, the brush 7 has the slide-contact portion 20 and the brush 207 has the slide-contact portion 220. The invention is not limited to such configurations. For example, the embodiments may include a plate brush 307 illustrated in FIG. 14, a precious metal brush 407 illustrated in FIG. 15, and carbon brushes 507 and 607 illustrated in FIGS. 16 and 17 respectively having slide-contact portions 320, 420, 520, and 620 on distal ends of arm sections 351, 451, 551, and 651.

The precious metal brush 407 is used mainly in a motor that operates under low current and voltage to generate small power. The slide-contact portion of a conventional precious metal brush is composed of precious metal (for example, AgPd or Pd), whereas the slide-contact portion 420 of the precious metal brush 407 is composed of an intermetallic compound. The carbon brushes 507 and 607 are used mainly in a motor that operates under high current and voltage to generate large power.

The plate brush 307, the precious metal brush 407, and the carbon brushes 507 and 607 respectively include fixing sections 360, 460, 560, and 660 each bonded to an end opposite the slide-contact portion 320, 420, 520, or 620 of the arm section 351, 451, 551, or 651.

In the embodiments, the whole slide-contact portion is composed of an intermetallic compound. The slide-contact portion however is not necessarily composed in such a manner. Only the surface of the slide-contact portion may be composed of an intermetallic compound in the embodiment.

In the embodiment, the brush has the slide-contact portion. The slide-contact portion needs not always be provided on a brush. A commutator may be provided with a slide-contact portion in the embodiment.

The embodiments described above are all described by way of illustration, not by way of limiting the scope of the present invention. The scope of the present invention is determined by the claims, not by the embodiments. Alterations equivalent to the claims all fall within the scope of the present invention.

DESCRIPTION OF REFERENCE SYMBOLS

D: container
2: permanent magnet
3: rotor
4: rotor shaft
5: armature
6: commutator
7: brush
9: casing
10: powder mixture
11: first metal
12: intermetallic compound phase
20: slide-contact portion
21: second metal
25: alloy layer
26: pore
27: carbon
51: arm section
60: fixing section
71: slide-contact face
91: case body
92: cap
100: motor
207: brush
220: slide-contact portion
225: conductive bonding material
271: slide-contact face 307: plate brush
320: slide-contact portion
351: arm section
360: fixing section
407: precious metal brush
420: slide-contact portion
460: fixing section
507: carbon brush
520: slide-contact portion
560: fixing section
607: carbon brush
620: slide-contact portion
660: fixing section

The invention claimed is:

1. A sliding member for a rotary device, the sliding member comprising:
 a slide-contact portion having a slide-contact face that contacts a rotating object, wherein
 the slide-contact face that contacts the rotating object contains an intermetallic compound that is an alloy containing one of (1) at least two selected from a first group consisting of Sn, Cu and Ni, and (2) at least two selected from a second group consisting of Sn, Cu, and Mn.

2. The sliding member according to claim 1, wherein the intermetallic compound is the result of a reaction between a first metal which is Sn or an alloy including Sn and a second metal which is a CuNi alloy, a CuMn alloy, an AgPd alloy, a CuAl alloy, or a CuCr alloy.

3. The sliding member according to claim 2, further comprising an arm section composed of a third metal bonded to the slide-contact portion with an alloy layer composed of the first metal and the third metal interposed therebetween.

4. The sliding member according to claim 1, wherein the intermetallic compound is a CuNiSn alloy.

5. The sliding member according to claim 1, wherein the intermetallic compound is one of $Cu_6Sn_5$, $Ni_3Sn_4$ and $Cu_2NiSn$.

6. The sliding member according to claim 1, wherein the slide-contact portion is a portion of a commutator or a brush.

7. The sliding member according to claim 1, wherein the slide-contact portion further contains carbon.

8. The sliding member according to claim 1, wherein the slide-contact portion is a porous material.

9. The sliding member according to claim 8, wherein the slide-contact portion has a porosity of 0.1 to 60%.

10. The sliding member according to claim 1, further comprising an arm section bonded to the slide-contact portion with a conductive bonding material.

11. A rotary device comprising:
 the slide-contact portion according to claim 1; and
 a rotor contacting the slide-contact portion.

* * * * *